US012208731B2

(12) United States Patent
Hong (10) Patent No.: US 12,208,731 B2
(45) Date of Patent: Jan. 28, 2025

(54) VIBRATION GENERATING METHOD FOR VEHICLE

(71) Applicants: Hyundai Motor Company, Seoul (KR); Kia Corporation, Seoul (KR)

(72) Inventor: Sang Jin Hong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 370 days.

(21) Appl. No.: 17/398,582

(22) Filed: Aug. 10, 2021

(65) Prior Publication Data

US 2022/0203891 A1  Jun. 30, 2022

(30) Foreign Application Priority Data

Dec. 29, 2020 (KR) .......................... 10-2020-0185585

(51) Int. Cl.
*B60Q 9/00* (2006.01)
*B60N 2/90* (2018.01)
(52) U.S. Cl.
CPC ............... *B60Q 9/008* (2013.01); *B60N 2/90* (2018.02); *B60N 2002/981* (2018.02)
(58) Field of Classification Search
None
See application file for complete search history.

(56) References Cited

U.S. PATENT DOCUMENTS

| | | | | |
|---|---|---|---|---|
| 9,963,068 | B2 * | 5/2018 | Hada | B60N 2/90 |
| 2007/0241595 | A1 * | 10/2007 | Nathan | B60Q 9/00 |
| | | | | 297/217.3 |
| 2007/0244641 | A1 * | 10/2007 | Altan | B60W 50/16 |
| | | | | 701/2 |
| 2008/0060861 | A1 | 3/2008 | Baur et al. | |
| 2013/0342330 | A1 * | 12/2013 | Kiefer | G08B 6/00 |
| | | | | 340/407.1 |

(Continued)

FOREIGN PATENT DOCUMENTS

| | | | | |
|---|---|---|---|---|
| CN | 103568949 | A | 2/2014 | |
| DE | 102012203642 | A1 * | 9/2013 | B62J 1/28 |

(Continued)

*Primary Examiner* — Muhammad Adnan
(74) *Attorney, Agent, or Firm* — Fox Rothschild LLP (57) ABSTRACT

A vibration providing method for a vehicle is capable of classifying various dangerous situations and warning of a dangerous situation based on the dangerous situation and a driving situation. The vibration generating method includes steps of: collecting, by a controller, information for warning of a dangerous situation of a vehicle and determining whether to warn of the dangerous situation, based on the collected information; determining, by the controller, a vibration property in accordance with the dangerous situation based on the collected information; generating, by the controller, a warning signal corresponding to the dangerous situation based on the determined vibration property; generating and outputting, by the controller, a control signal for generating vibration having the vibration property based on the generated warning signal; and operating a vibration actuator, installed in a seat, based on the outputted control signal and generating the vibration, representing the dangerous situation, through the seat.

14 Claims, 6 Drawing Sheets

(56) References Cited

U.S. PATENT DOCUMENTS

| | | | | |
|---|---|---|---|---|
| 2014/0375443 | A1* | 12/2014 | Aoyagi | B60Q 5/008 |
| | | | | 340/425.5 |
| 2015/0328985 | A1* | 11/2015 | Kim | G08B 21/06 |
| | | | | 180/272 |
| 2017/0225591 | A1* | 8/2017 | Tobata | B60N 2/20 |
| 2020/0238875 | A1* | 7/2020 | Godlewski | B60N 2/99 |
| 2020/0334923 | A1* | 10/2020 | Yamamoto | B60Q 9/00 |
| 2021/0101512 | A1* | 4/2021 | Shimizu | B60N 2/90 |
| 2022/0198890 | A1* | 6/2022 | Kim | H02K 33/18 |
| 2023/0016272 | A1* | 1/2023 | Kim | B60W 50/14 |
| 2023/0311720 | A1* | 10/2023 | Tanabe | B60N 2/02246 |
| | | | | 296/65.01 |

FOREIGN PATENT DOCUMENTS

| | | |
|---|---|---|
| FR | 3075140 A1 | 6/2019 |
| KR | 101731190 B1 | 4/2017 |
| KR | 101904726 B1 | 10/2018 |
| KR | 2018-0136170 A | 12/2018 |

* cited by examiner

VIBRATION GENERATING METHOD FOR VEHICLE

CROSS-REFERENCE TO RELATED APPLICATION

This application claims under 35 U.S.C. § 119(a) the benefit of Korean Patent Application No. 10-2020-0185585 filed on Dec. 29, 2020, the entire contents of which are incorporated herein by reference.

BACKGROUND

(a) Technical Field

The present disclosure relates to a vibration providing method for a vehicle, more particularly, to the vibration generating method that is capable of generating a warning of a dangerous situation in the vehicle by generating a vibration.

(b) Description of the Related Art

As is well known, an electric vehicle (EV) refers to a vehicle that travels using a motor. A drive system of the electric vehicle includes a battery configured to supply power for operating the motor, an inverter connected to the battery and configured to operate and control the motor, the motor configured to serve as a vehicle driving source and connected to the battery through the inverter so as to charge or discharge the battery, and a speed reducer configured to reduce rotational force of the motor and transmit the rotational force to a driving wheel.

In this case, the inverter operates the motor by converting direct current (DC), which is supplied from the battery, into alternating current (AC) and then applying the alternating current to the motor through a power cable. The inverter regenerates energy from the motor and charges the battery by converting alternating current, which is generated by the motor, into direct current and then supplying the direct current to the battery.

Unlike a vehicle equipped with an internal combustion engine, a typical electric vehicle does not use a multi-stage transmission, but instead uses the speed reducer disposed between the motor and the driving wheel and using a fixed gear ratio. This is because the motor has a relatively small difference in efficiency between operating points and may implement high torque at a low speed only by virtue of the single motor, unlike the internal combustion engine that has a wide distribution range of energy efficiency in accordance with operating points and may provide high torque only in a high-speed region.

The vehicle equipped with the drive system for the internal combustion engine in the related art requires a torque distribution mechanism such as a torque converter or a clutch because of a characteristic of the internal combustion engine that does not permit it to operate at a low speed. However, the torque distribution mechanism may be eliminated from the drive system of the electric vehicle because the motor is easy to operate at a low speed. Because of the characteristic of the drive system of the electric vehicle, the drive system does not have an inherent vibration that is generated by a torsional damper or a dual mass flywheel such as that used for the drive system in the vehicle equipped with the internal combustion engine.

Because of this mechanical difference, the electric vehicle may provide smooth drivability without interruption caused by gear shifting, unlike a vehicle equipped with an internal combustion engine. The drive system of the electric vehicle generates power by operating the motor with power from the battery instead of generating power by combusting fuel like the vehicle equipped with the internal combustion engine. Therefore, torque of the electric vehicle is generally delicate and smooth and implements quick responsiveness in comparison with torque of the internal combustion engine.

These characteristics are considered as positive attributes of the electric vehicle, but the absence of the internal combustion engine, the transmission, and the clutch may result in a feeling of boredom for certain drivers. Various effects generated by noise, a physical vibration, and thermodynamic operations of the internal combustion engine are sometimes considered important to drivers in the field of high-performance vehicles.

The absence of the vibration while a driver is driving the electric vehicle may be advantageous in providing smooth drivability without interruption, but inclusion of vibrations in the vehicle may allow the driver to replicate feelings associated with vehicle performance in an internal combustion engine vehicle.

Therefore, in the electric vehicle that does not have the internal combustion engine, the transmission, the clutch, and the like, there is a need for a technology capable of allowing the driver to experience feelings of acceleration, deceleration, vibration during traveling, gear shifting impact, or the like, which are typically experienced in the vehicle equipped with the internal combustion engine. In addition, there is a need for a technology capable of generating a virtual vibration in conjunction with virtual sound in the electric vehicle.

Meanwhile, the driver encounters various types of dangerous situations while driving the vehicle. For example, the vehicle may depart from a lane, the vehicle may collide with an obstacle positioned behind or beside the vehicle, or the vehicle may collide with a preceding vehicle without keeping a safety distance. In addition, there may occur dangerous or unexpected situations such as approach of a pedestrian, a driver's drowsiness, a lack of fuel, a rise in temperature (overheating), door opening, an unfastened seatbelt, and the like.

Therefore, there is a need for a technology capable of quickly and accurately warning the driver of a detected dangerous situation of the vehicle, that is, a technology capable of classifying various dangerous situations (warning situations) and thus more realistically and effectively warning of the currently generated dangerous situation. As a method of warning the driver of the dangerous situation of the vehicle, a warning method using a driver's sight, hearing, or touch (vibration or the like) may be effective.

The above information disclosed in this Background section is only for enhancement of understanding of the background of the invention and therefore it may contain information that does not form the prior art that is already known in this country to a person of ordinary skill in the art.

SUMMARY

The present disclosure provides a vibration generating method for a vehicle, which is capable of quickly and accurately warning a driver of a detected dangerous situation of a vehicle by means of a vibration, classifying various dangerous situations, and more realistically and effectively warning of a dangerous situation in accordance with a currently experienced dangerous situation and a driving situation.

In one aspect, the present disclosure provides a vibration generating method for a vehicle, including: collecting, by a controller, information for warning of a dangerous situation of a vehicle and determining whether to warn of the dangerous situation, based on the collected information; determining, by the controller, a vibration property in accordance with the dangerous situation based on the collected information; generating, by the controller, a warning signal corresponding to the dangerous situation based on the determined vibration property; generating and outputting, by the controller, a control signal for generating vibration having the vibration property based on the generated warning signal; and operating a vibration actuator, installed in a seat, based on the outputted control signal and generating the vibration, representing the dangerous situation, through the seat.

According to the vibration generating method for a vehicle according to the present disclosure, it is possible to quickly and accurately warn the driver of a detected dangerous situation of the vehicle by means of a vibration, divide various dangerous situations, and more realistically and effectively warn of the dangerous situation in accordance with the currently experienced dangerous situation and the driving situation.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions disclosed in embodiments of the present disclosure are exemplified only for the purpose of explaining embodiments according to the concept of the present disclosure, and the embodiments according to the concept of the present disclosure may be carried out in various forms. In addition, the present disclosure should not be interpreted as being limited to the embodiments disclosed in the present specification, and it should be understood that the present disclosure includes all modifications, equivalents, and alternatives included in the spirit and the technical scope of the present disclosure.

Meanwhile, the terms such as "first" and/or "second" in the present disclosure may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

Like reference numerals indicate like constituent elements throughout the specification. The terms used in the present specification are for explaining the embodiments, not for limiting the present disclosure. Unless particularly stated otherwise in the present specification, a singular form also includes a plural form.

Hereinafter, the embodiments of the present disclosure will be described in detail with reference to the accompanying drawings.

The present disclosure is intended to provide a vibration generating method for a vehicle, which is capable of quickly and accurately warning a driver of a detected dangerous situation of a vehicle by use of a vibration, classifying various dangerous situations (warning situations), and more realistically and effectively warning of a dangerous situation in accordance with a currently experienced dangerous situation and a driving situation.

In particular, the present disclosure is characterized by generating vibration patterns differentiated in accordance with the situations. More particularly, the present disclosure is characterized by generating the vibration patterns varying depending on the dangerous situations and the driving situations, thereby enabling the driver to recognize the current situation based on the vibration pattern. The fact that the driver may recognize the current situation based on the vibration pattern means that the driver may feel and sense vibration with his/her body and identify the current situation by sensing (tactually recognizing) the vibration.

In addition, in the present disclosure, the situation that the vibration generating method warns of by generating a vibration may be situation preset in a controller of a vibration generating apparatus or a controller of a danger warning system that performs cooperative control together with the controller of the vibration generating apparatus. In this case, the situation preset in the controller may be set without limitation as long as the situation is the dangerous situation or the driving situation (hereinafter, collectively referred to as the 'dangerous situation') that the driver needs to be warned of while driving the vehicle. In the present disclosure, based on information collected by the vehicle, the detection of the dangerous situation may be performed by the controller of the vibration generating apparatus or the controller of the danger warning system.

In more detail, the controller of the vibration generating apparatus may detect the dangerous situation based on information detected by a detection element such as a sensor.

The dangerous situation may be detected by a process in which the controller determines whether a condition predetermined depending on preset logic is satisfied based on an electrical signal transmitted, through a vehicle network, by another controller or the detection element such as a sensor, and when the condition is satisfied, the controller determines the situation as the dangerous situation that the driver needs to be warned of.

The detection of the dangerous situation and the warning by use of the vibration (hereinafter, referred to as 'vibration warning') according to the present disclosure may be carried out in conjunction with the operation of the danger warning system in the vehicle. That is, the detection of the dangerous situation and the vibration warning may be performed by the cooperative control between the controller of the vibration generating apparatus and the controller of the danger warning system in the vehicle. In this case, when the danger warning system of the vehicle detects and identifies the dangerous situation and the danger warning system transfers information about the detected or identified dangerous situation to the controller of the vibration generating apparatus, the controller of the vibration generating apparatus may perform a control process of performing the vibration warning based on the information of the dangerous situation.

In the present disclosure, examples of the dangerous situations, which require the vibration warning, may include departures from lanes, collisions with obstacles positioned behind and beside the vehicle, approach of oncoming vehicles, rear-end collisions, approach of pedestrians, the driver's drowsiness, and the like. In order to cope with the dangerous situations, in the typical vehicle, there is already applied the danger warning system for detecting and warning of the dangerous situation in accordance with logic preset based on information collected in real time by the vehicle, such as vehicle driving information, surrounding environment information, or driver state information.

For example, a lane departure warning system (LDWS) for detecting and warning of a dangerous situation in which the vehicle departs from the lane, a blind-spot collision warning system (BCWS) for detecting and warning of a dangerous situation in which the vehicle collides with an obstacle (including a vehicle) positioned behind or beside the vehicle, a forward collision warning system (FCWS) for detecting and warning of a dangerous situation in which the vehicle collides with an obstacle (including a vehicle) in front of the vehicle, a pedestrian detection warning system (PDWS) for detecting and warning of approach of the pedestrian, and a driver state warning system (DSWS) for detecting and warning of a driver state are applied to the vehicle.

As described above, in the present disclosure, the danger warning system may detect the dangerous situation, and the vibration warning may be performed in the vehicle by warning of the detected dangerous situation in conjunction with the danger warning system. For example, when the danger warning system detects the dangerous situation such as the departure from the lane, the collision, and the driver's drowsiness, the vibration generating apparatus according to the present disclosure may operate in conjunction with the danger warning system so as to warn the driver of the dangerous situation.

In this case, as described above, the cooperative control for the vibration warning may be performed between the controller of the danger warning system and the controller of the vibration generating apparatus. Alternatively, the controller of the vibration generating apparatus and the controller of the danger warning system according to the present disclosure may be integrated into a single control system, and the integrated control system may detect the dangerous situation and perform the vibration warning.

In the present disclosure, the vibration warning may be referred to as tactile warning (tactual warning) because the vibration warning enables the driver to feel the vibration with his/her body and to be warned of the dangerous situation by use of the vibration felt with his/her body. In this regard, the vibration generating (vibration warning) process according to the present disclosure may operate in conjunction with visual warning and auditory warning in the vehicle in the related art.

For example, in a vehicle, the visual warning may be performed by use of a warning light, a cluster, a head-up display, and other display devices in the vehicle, and the visual warning may operate in conjunction with the vibration warning using vibration actuators. Alternatively, in the vehicle, the auditory warning may be performed by use of an acoustic device including a speaker, and the auditory warning may operate in conjunction with the vibration warning using the vibration actuators. Of course, when the visual warning and the auditory warning are performed at the same time, the vibration warning may also be performed in conjunction with the visual warning and the auditory warning.

In the present disclosure, the vibration warning may be a warning implemented by the vibration provided through a seat. To this end, in the present disclosure, the vibration actuators for generating the vibration may be installed in the seat. In this case, the seat may be any seat in the vehicle, such as a driver seat, a passenger seat, and a rear seat. Therefore, when the vibration actuators installed in the seat are operated, the vibration generated by the vibration actuators may be transmitted to the body of the driver or the passenger seated in the seat. In the state in which the driver is seated in the seat as described above, the driver may recognize the dangerous situation while feeling, with his/her body, the vibration transmitted through the seat.

Hereinafter, the vibration actuator installed in the seat will be described.

Figure 1A:
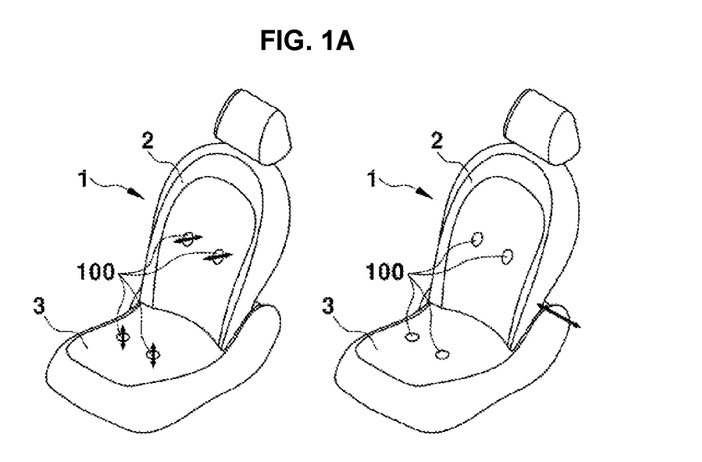
FIG. 1A is a view schematically illustrating positions at which vibration actuators of a vibration generating apparatus according to an embodiment of the present disclosure are installed in a seat.
Figure 1B:
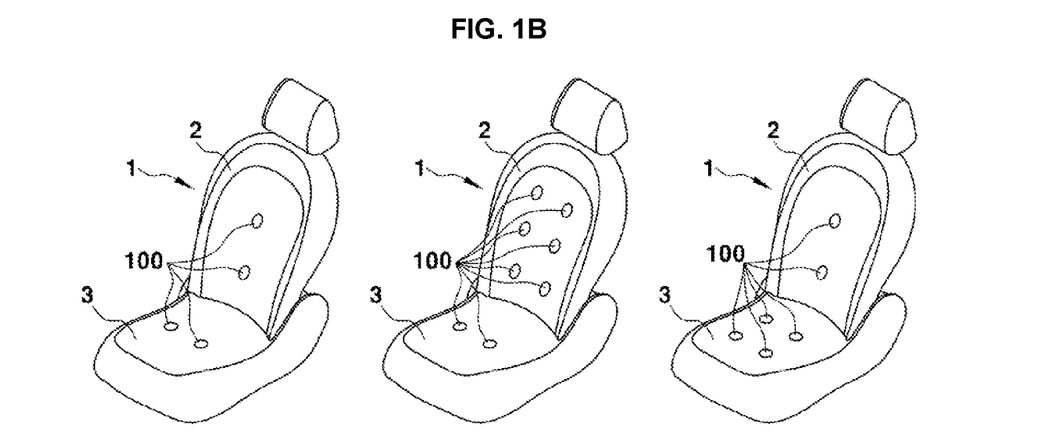
FIG. 1B is a view illustrating various examples in which the numbers and the installation positions of the vibration actuators of the vibration generating apparatus according to the embodiment of the present disclosure are variously set.

FIG. 1A is a view schematically illustrating positions at which the vibration actuators of the vibration generating apparatus according to the embodiment of the present disclosure are installed in the seat. In addition, FIG. 1B is a view illustrating various examples in which the numbers and the installation positions of the vibration actuators of the vibration generating apparatus according to the embodiment of the present disclosure are variously set.

As described above, the vibration generating apparatus according to the embodiment of the present disclosure serves to generate a vibration in the vehicle and includes vibration actuators 100 embedded in a seat 1. In this case, the vibration generating apparatus according to the embodiment of the present disclosure may include a plurality of vibration actuators 100 embedded in the seat 1.

In this case, as illustrated in FIG. 1A, a predetermined numbers of vibration actuators 100 may be installed in a seatback 2 and a seat cushion 3 of the seat 1 in the vehicle. It can be seen from FIG. 1A that the two vibration actuators 100 are installed in each of the seatback 2 and the seat cushion 3, the number of vibration actuators 100 is exemplary, and the present disclosure is not limited thereto. The numbers or the installation positions of the vibration actuators 100 installed in the seat 10 may be variously changed as illustrated in FIG. 1B.

The left view in FIG. 1A illustrates an example in which the vibration actuators 100 installed in the seatback 2 generate a vibration in a forward/rearward direction (see the arrows) based on a vehicle body direction and the vibration actuators 100 installed in the seat cushion 3 generate a vibration in an upward/downward direction (see the arrows) based on the vehicle body direction. In addition, the right view in FIG. 1A illustrates an example in which all the vibration actuators 100 installed in the seatback 2 and the seat cushion 3 generate a vibration in a left-right direction (see the arrows) based on the vehicle body direction.

In the embodiment of the present disclosure, when information about a dangerous situation detected by an external component such as another controller is inputted or when the controller directly detects a dangerous situation based on collected information, the controller determines to warn of the dangerous situation, and based on the necessity for warning, the controller generates a vibration property and a warning signal corresponding to the dangerous situation by using predetermined logic set in the controller. Then, the controller generates and outputs a control signal for controlling the operations of the vibration actuators installed in the seat, based on the warning signal.

Figure 2:
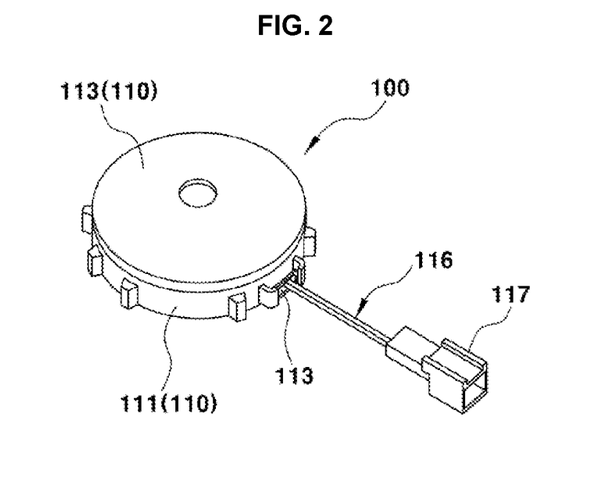
FIG. 2 is a perspective view illustrating an example of the vibration actuator available to the vibration generating apparatus according to the embodiment of the present disclosure.

FIG. 2 is a perspective view illustrating an example of the vibration actuator available to the vibration generating apparatus according to the embodiment of the present disclosure. The vibration actuator 100 of the vibration generating apparatus according to the embodiment of the present disclosure may be installed in each of the seatback 2 and the seat cushion 3 as described above (see FIGS. 1A and 1B), and the vibration actuator 100 may be installed in a foam pad in each of the seatback 2 and the seat cushion 3. When the vibration actuator 100 is installed in the foam pad of the seat 1 as described above, a driver or a passenger seated in the seat may feel, with his/her body, the vibration generated by the vibration actuator when the vibration actuator 100 operates.

In the present disclosure, the vibration actuator 100 may be connected to a drive circuit unit (not illustrated) by a terminal 113 provided in a casing 110 and by a wire assembly 116 connected to the terminal 113. Therefore, when an electrical signal (actuator drive current) for generating a vibration is applied through the drive circuit unit provided inside or outside the controller in accordance with a control signal outputted from a controller (not illustrated, a first controller to be described below), the electrical signal may be inputted from the drive circuit unit to the vibration actuator 100 through a connector 117 and the wire assembly 116.

As a result, as the operation of the vibration actuator 100 is controlled based on the applied electrical signal, the vibration actuator may generate a desired vibration. In this case, the electrical signal may be the controlled by the actuator drive current which is applied from the drive circuit unit to each of the vibration actuators based on the control signal outputted by the controller. As the controller applies the controlled current to the vibration actuator 100, the vibration actuator may generate a desired vibration.

As described above, in the embodiment of the present disclosure, when the information about the dangerous situation is inputted or the controller directly detects the dangerous situation, the controller generates the vibration property and the warning signal corresponding to the dangerous situation based on predetermined logic set in the controller. Then, based on the warning signal, the controller generates and outputs the control signal for controlling the operation of the vibration actuator installed in the seat.

In this case, in the state in which the plurality of vibration actuators is installed in the seat, the controller may differently control the operations of the vibration actuators so that the respective vibration actuators implement different operating states in accordance with the dangerous situations. For example, the controller enables only the selected vibration actuators, among all of the vibration actuators, to be operated, all the vibration actuators to be individually and differently operated, or a predetermined number of vibration actuators, set for each group, among all of the vibration actuators to be differently operated.

In order to differently control the vibration actuators, the controller may differently control the operations of the respective vibration actuators so that the respective vibration actuators or the groups of the divided vibration actuators generate the vibrations having different properties. In this case, the vibration properties may include a point in time at which the vibration is generated, vibration generation time, and a frequency and an amplitude (intensity) of the vibration which are preset for each vibration actuator in accordance with the dangerous situations.

The controller enables the respective vibration actuators or the groups of the vibration actuators to generate vibration having at least one different vibration property. Alternatively, the controller presets and configures a plurality of vibration patterns having different vibration properties, and then enables the respective vibration actuators or the groups of the vibration actuators to generate different vibration patterns.

To this end, the controller may determine the vibration property corresponding to the dangerous situation based on the logic set in the controller, generate the warning signal in accordance with the determined vibration property, and generate and output the control signal for controlling the operations of the vibration actuators installed in the seat, based on the generated warning signal.

Therefore, the vibration actuators in the seat operate based on the control signal outputted by the controller and generate the vibration, which is designated in accordance with the dangerous situation, and as a result, the driver or the passenger seated in the seat may feel the vibration generated in accordance with the dangerous situation. According to the present disclosure, a warning-signal-based vibration, which is generated based on the warning signal, may be implemented and provided.

There has been described the configuration in which the function of generating the warning-signal-based vibration, that is, the vibration generating function of generating the vibration based on the warning signal for warning of the dangerous situation is performed in all the seats in the vehicle without distinguishing the driver seat, the passenger seat, and the like. However, a sound-based vibration generating function, which generates a vibration based on virtual sound in the vehicle, may be performed together with the warning-signal-based vibration generating function.

For example, with the driver seat distinguished from other seats in the vehicle, in the driver seat, the sound-based vibration generating function, which generates a vibration based on virtual sound of the vehicle, may be performed at normal times, and the warning-signal-based vibration generating function, which generates a vibration designated in accordance with the dangerous situations, may be performed when the dangerous situation is detected. In addition, in the passenger seat or other seats, only the sound-based vibration generating function, which generates a vibration based on the virtual sound of the vehicle, may be performed.

Figure 3:
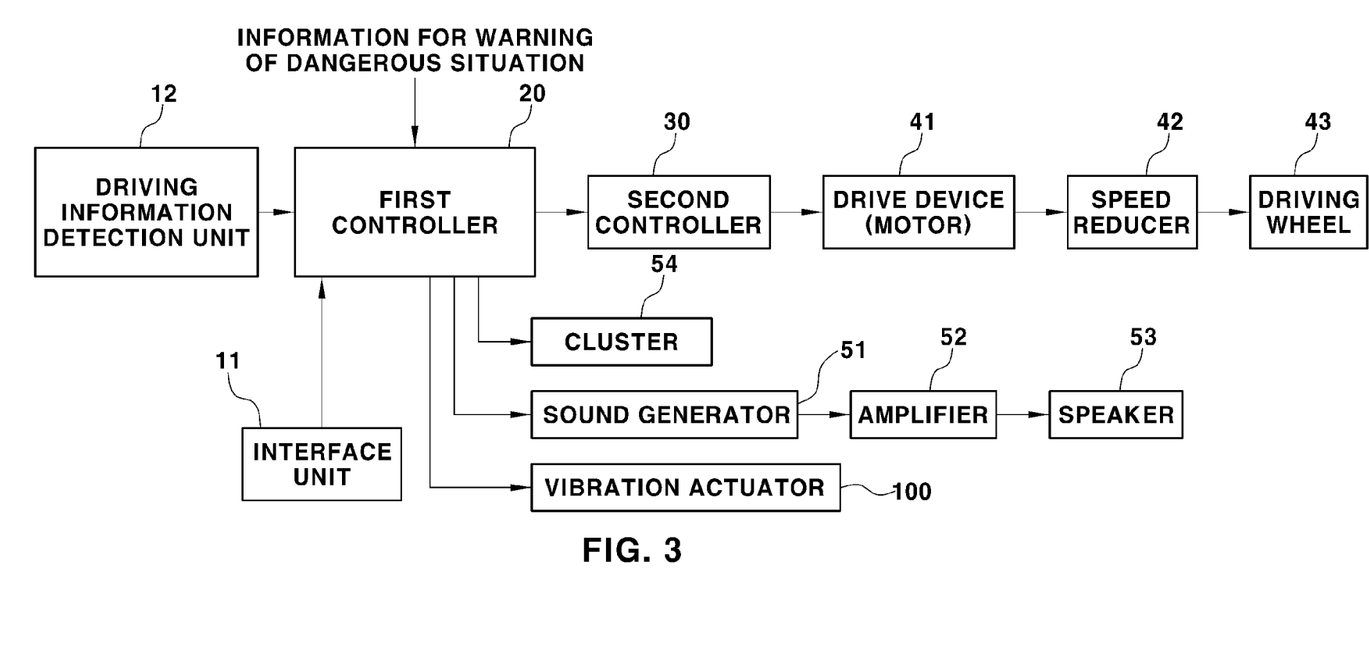
FIG. 3 is a block diagram illustrating a configuration of the vibration generating apparatus according to the embodiment of the present disclosure.

Hereinafter, the configuration of the vibration generating apparatus according to the embodiment of the present disclosure will be described in more detail. FIG. 3 is a block diagram illustrating the configuration of the vibration generating apparatus according to the embodiment of the present disclosure.

The vibration generating apparatus for a vehicle according to the embodiment of the present disclosure may be applied to an electric vehicle equipped with a speed reducer without having an internal combustion engine (engine) and a multi-stage transmission. The vibration generating apparatus may include the vibration actuator 100 configured to generate a vibration in accordance with a warning signal or a virtual effect producing signal in the electric vehicle.

In particular, the vibration generating apparatus for a vehicle according to the embodiment of the present disclosure includes a controller 20 configured to output a control signal for generating vibration in accordance with logic preset in the controller 20 based on information collected by the vehicle, and the vibration actuator 100 configured to be controlled in operation based on the control signal outputted by the controller 20. As described above, the vibration generating apparatus may use the plurality of vibration actuators installed in the seat in the vehicle.

The controller 20 is a controller for performing control to provide a vibration. In the embodiment illustrated in FIG. 3, the controller 20 for performing control to provide a vibration is a first controller. The first controller 20 determines the vibration property corresponding to the dangerous situation in accordance with the logic based on information collected by the vehicle, generates the warning signal in accordance with the determined vibration property, and generates and outputs the control signal for controlling the operations of the vibration actuators 100 installed in the seat, based on the generated warning signal.

In the embodiment of the present disclosure, the first controller 20 performs the control for generating a vibration in the vehicle and may also perform a function of generating a torque command for a drive device 41 for driving the vehicle.

Referring to the apparatus illustrated in FIGS. 1A-1B, when a vehicle to which the present disclosure is applied is an electric vehicle, the vehicle includes a driving information detection unit 12 configured to detect vehicle driving information, the first controller 20 configured to generate the torque command based on the vehicle driving information detected by the driving information detection unit 12, a second controller 30 configured to control an operation of the drive device 41 based on the torque command outputted from the first controller 20, the drive device 41 configured to be controlled in operation based on the torque command, a speed reducer 42 configured to reduce rotational force of the drive device 41 and transmit the reduced rotational force, and a driving wheel 43 configured to be rotated by the rotational force transmitted from the speed reducer 42.

In this case, the first controller 20 may be a controller that performs the control for generating the vibration (generating the warning-signal-based vibration and the virtual sound-based vibration) in the vehicle, as described above. In addition, the drive device 41, the speed reducer 42, and the driving wheel 43 are devices or components constituting the drive system of a typical electric vehicle, and the drive device 41 is a drive motor (hereinafter, simply referred to as a 'motor') for driving an electric vehicle.

The vehicle may further include an acoustic device configured to generate and output virtual sound based on the control signal outputted from the first controller 20. The acoustic device may include a sound generator 51 configured to generate and output a sound signal based on the control signal, and an amplifier 52 and a speaker 53 such as a woofer configured to operate based on the sound signal and output the virtual sound. The speaker 53 is installed at one or more locations inside and outside the vehicle. In particular, a plurality of speakers 53 may be installed in the vehicle and be used to output the virtual sound.

In the embodiment illustrated in FIG. 3, the first controller 20 generates and outputs the torque command based on the vehicle driving information, and the second controller 30 controls the operation of the drive device 41 based on the torque command outputted by the first controller 20. The first controller 20 and the second controller 30 are controllers involved in a control process of generating the virtual sound and the vibration in the vehicle and a driving control process of driving the vehicle.

In the following description, a control subject is divided into the first controller 20 and the second controller 30, but the control process of generating the virtual sound and the vibration and the driving control process according to the present disclosure may be performed by a single integrated control element instead of the plurality of controllers.

All of the plurality of controllers and the single integrated control element may be commonly referred to as a controller, and the integrated controller may perform the control process of generating the virtual sound output and the vibration according to the present disclosure to be described below. In this case, the controller may commonly refer to both the first controller 20 and the second controller 30.

The vibration generating apparatus according to the embodiment of the present disclosure may further include an interface unit 11 configured to enable the driver to selectively input an ON/OFF operation of turning on or off a virtual effect implementing function including generation of the virtual sound output and the virtual sound-based vibration and a warning-signal-based vibration generating function of generating the vibration based on the warning signal.

In the embodiment of the present disclosure, any device may be used as the interface unit 11 as long as the device allows the driver to turn on or off the virtual effect implementing function and the warning-signal-based vibration generating function in the vehicle. For example, the interface unit 11 may be an operating device such as a button or a switch provided in the vehicle, an input device for an AVN (audio, video, navigation) system, or a touch screen.

The interface unit 11 may be connected to the first controller 20. Therefore, when the driver performs the turning-on and turning-off operations through the interface unit 11, an on signal or an off signal may be inputted to the first controller 20 through the interface unit 11. As a result, the first controller 20 may recognize the on or off operation of the virtual effect implementing function performed by the driver.

In the present disclosure, both the virtual effect implementing function (of generating the virtual sound and the virtual vibration) and the warning-signal-based vibration generating function (of generating a vibration for warning in accordance with the dangerous situation) while the vehicle travels are performed only when the driver inputs the ON operation through the interface unit 11.

As long as the interface unit 11 is an input device for a vehicle provided in the vehicle, the driver may perform the operations of turning on or off the virtual effect implementing function and the warning-signal-based vibration generating function by using a mobile device as another example of the interface unit. The mobile device needs to be connected to a device in the vehicle, for example, the first controller 20 so as to communicate with the first controller 20. To this end, an input/output communication interface is used for communication connection between the mobile device and the first controller 20.

The driving information detection unit 12 is configured to detect the vehicle driving information (driving variable information) required to perform a virtual sound outputting function and a virtual vibration generating function in addition to the vehicle driving information required to generate the torque command in the vehicle. The driving information detection unit 12 according to the embodiment of the present disclosure may include an accelerator pedal detection unit configured to detect accelerator pedal input information (accelerator pedal input value) generated in accordance with manipulation of an accelerator pedal by the driver, and a speed detection unit configured to detect a speed of the vehicle drive system.

In this case, the accelerator pedal detection unit may be a typical accelerator position sensor (APS) installed on the accelerator pedal and configured to output an electrical signal in accordance with the state of the manipulation of the accelerator pedal by the driver. In addition, the speed detection unit serves to acquire information about a speed of the vehicle drive system, and the drive system speed may be a rotational speed (motor speed) of a motor, that is, the drive motor 41 for driving the vehicle, a rotational speed (driving wheel speed) of the driving wheel 43, or a rotational speed (drive shaft speed) of a drive shaft. In this case, the speed detection unit may be a resolver installed in the drive motor 41, a wheel speed sensor installed on the driving wheel 43, or a sensor capable of detecting a speed of the drive shaft.

In the present disclosure, the vehicle driving information may further include a vehicle speed that may be used to generate the torque command. In this case, the driving information detection unit 12 may further include a vehicle speed detection unit configured to detect a current vehicle driving speed, and the vehicle speed detection unit may include the wheel speed sensor installed on the driving wheel 43 of the vehicle.

The first controller 20 determines and generates the torque command from the vehicle driving information, determines a property of a virtual effect from the vehicle driving information, or the vehicle driving information and virtual variable information, and generates and outputs a virtual effect producing signal based on the determined property of the virtual effect. In this case, the virtual variable information may include a virtual engine speed, a virtual vehicle speed, a virtual gear shift position, and the like determined from the vehicle driving information by an internal combustion engine model in the vehicle in which a virtual effect producing function is performed.

The torque command may be a motor torque command determined and generated based on the vehicle driving information collected while the typical electric vehicle travels. The first controller 20 may be a vehicle control unit (VCU) configured to generate the motor torque command based on the vehicle driving information in the typical electric vehicle.

The second controller 30 is a controller configured to control the operation of the drive device 41 by receiving the torque command transmitted from the first controller 20. In the present disclosure, the drive device 41 may be a motor, that is, the drive motor 41 connected to the driving wheel 43 of the vehicle and configured to drive the vehicle, and the second controller 30 may be a publicly-known motor control unit (MCU) configured to operate the motor 41 through the inverter in the typical electric vehicle and control the operation of the motor 41.

In FIG. 3, the torque and the rotational force outputted by the motor, which is the drive device 41, are reduced by the speed reducer 42 and then transmitted to the driving wheel 43. In FIG. 3, reference numeral 54 indicates a cluster installed in front of the driver seat in the vehicle, and the cluster 54 may display the current virtual engine speed and the current virtual gear shift position in addition to the current vehicle speed.

In the present disclosure, the virtual effect producing signal used to generate and output the virtual sound and the virtual vibration is a signal that matches the properties of the virtual sound and the virtual vibration, which acts in conjunction with the virtual sound, under the current vehicle operating condition. When the controller generates and outputs the virtual effect producing signal corresponding to the property of the virtual sound based on the vehicle driving information as described above, the acoustic device outputs desired virtual sound by using a sound source signal and the virtual effect producing signal. In addition, the controller generates and outputs the control signal for controlling the operation of the vibration actuator from the virtual effect producing signal, and based on the control signal, the vibration actuator 100 generates and outputs the virtual vibration that acts in conjunction with the virtual sound.

In the present disclosure, the vibration generating process may basically include a warning-signal-based vibration generating process of basically generating and generating the warning vibration in accordance with the dangerous situation. In addition, the vibration generating process may further include a virtual vibration generating (virtual sound-based vibration generating) process of generating and providing the virtual vibration in accordance with the vehicle operating condition while the virtual sound is generated and provided in accordance with the vehicle operating condition.

Hereinafter, the virtual effect implementing function including the virtual sound generating function and the virtual vibration generating (virtual sound-based vibration generating) function and a method of performing the same will be described.

In the present disclosure, the virtual effect includes the virtual sound and the virtual vibration provided together with the virtual sound, and the virtual vibration differs from the vibration for warning of the dangerous situation.

In a virtual effect implementing process, the controller (first controller) 20 and the vibration actuator 100 may generate the virtual vibration that acts in conjunction with the virtual sound. To this end, the controller determines the property of the virtual effect based on the vehicle driving information and generates the virtual effect producing signal based on information about the determined property of the virtual effect.

The controller controls operations of acoustic devices 51, 52, and 53 based on the generated virtual effect producing signal so that the acoustic devices output the virtual sound. At the same time, the controller controls the operation of the vibration actuator 100 based on the virtual effect producing signal so that the vibration actuator generates and outputs a desired virtual vibration.

In the present disclosure, the virtual sound generated and outputted by the acoustic device and the virtual vibration artificially generated by the vibration actuator may be sound and a vibration that are generated in accordance with vehicle driving and traveling states of the electric vehicle. The virtual sound and virtual vibration may be virtual sound and a virtual vibration which imitate sound and a vibration that may be generated in a vehicle, for example, a vehicle equipped with an internal combustion engine and different in drive system from the vehicle to be applied.

In the present disclosure, the virtual sound may be virtual engine sound which imitates engine sound that may be generated by a drive system, for example, an internal combustion engine, which is a drive device (power engine) of the drive system of the vehicle equipped with the internal combustion engine and is different from the drive system of the electric vehicle, while the vehicle travels. Because the electric vehicle does not have the engine, the virtual engine sound is also the virtual sound, not actual noise generated by the electric vehicle. The virtual engine sound is virtual traveling sound generated virtually by a virtual engine in accordance with the operating condition while the electric vehicle travels.

Alternatively, in the present disclosure, the virtual sound may be motor sound generated by the motor, which is a drive device (power engine) of the electric vehicle, while the vehicle travels. In this case, the motor sound is virtual motor sound, not actual noise of the motor, and the motor sound is virtual traveling sound (driving sound) generated virtually by a virtual motor in accordance with the operating condition while the vehicle travels.

In the present disclosure, the virtual vibration may be a vibration that imitates an engine vibration or a vehicle vibration generated corresponding to the vehicle driving information, or the virtual vibration may be a vibration that imitates gear shifting impact generated corresponding to the vehicle driving information. That is, in the present disclosure, the generated and implemented virtual vibration may be a virtual vibration that imitates a traveling vibration generated when the vehicle equipped with the internal combustion engine travels at a constant speed, accelerates, or decelerates. Alternatively, the virtual vibration may be a vibration that imitates gear shifting impact in the vehicle equipped with the internal combustion engine.

For example, when a gear shifting signal is generated based on control logic for implementing a virtual gear shifting function in the controller, the vibration actuator operates to generate a vibration for producing a virtual gear shift property (gear shifting impact). Alternatively, in the present disclosure, the generated and implemented vibration may be a vibration that imitates a vibration caused by post-combustion in the vehicle equipped with the internal combustion engine.

In the present disclosure, when the acoustic device is used to generate and output the virtual sound in accordance with the vehicle driving information and the vibration actuator is used to generate the vibration in accordance with the vehicle driving information, the accelerator pedal input value inputted by the driver, the motor torque command, or the drive system speed may be used as an actual vehicle operating condition of the electric vehicle, that is, the vehicle driving information used to generate the virtual effect producing signal.

Among types of virtual sound, the virtual traveling sound, that is, the virtual motor sound or the virtual engine sound may be divided into acceleration sound, constant-speed traveling sound, and deceleration sound depending on the manipulation of the accelerator pedal by the driver. The acceleration sound may be outputted when the driver pushes the accelerator pedal, and the constant-speed traveling sound or the deceleration sound may be outputted when the driver releases the accelerator pedal.

The drive system speed is a rotational speed of a component of the vehicle drive system which is detected by a sensor, and the drive system speed may be a rotational speed (motor speed) of the drive motor, a rotational speed (driving wheel speed) of the driving wheel, or a rotational speed (drive shaft speed) of the drive shaft. Alternatively, the virtual engine speed, which is a virtual variable, may be used as the drive system speed information. The controller may calculate the virtual engine speed as a value of a variable multiple of the drive system speed detected by the sensor. In this case, the drive system speed detected by the sensor may be the motor speed. In this case, a value of a coefficient by which the motor speed is multiplied to calculate the virtual engine speed may be a value determined depending on a virtual transmission, a gear ratio model, and a virtual current gear shift position.

There is known a control method of generating a virtual gear shift property of the electric vehicle in order to generate and implement a multi-stage gear shift property by performing torque control on the drive motor in the electric vehicle that does not have a multi-stage transmission. In addition, it is known that the virtual engine speed is used as one of the virtual variables required to generate and implement the multi-stage gear shift property during the control process of generating the virtual gear shift property of the electric vehicle.

As described above, the virtual engine speed, which is one of the virtual variables used to generate and implement the multi-stage gear shift property, may be used as the virtual variable for outputting the virtual sound in the present disclosure. In the embodiment of the present disclosure, the controller (the first controller to be described below) may determine the virtual engine speed by using the virtual vehicle speed and the gear ratio information at the virtual current gear shift position.

In this case, the virtual vehicle speed may be calculated as a value proportional to an actual motor speed by using a virtual final reduction gear ratio and the actual motor speed which is one of the actual variable (input variable) information. In this case, the virtual final reduction gear ratio is a value preset in the controller. In the embodiment of the present disclosure, the virtual vehicle speed may be calculated by using the virtual final reduction gear ratio and the actual motor speed measured while the vehicle travels, and the virtual engine speed may be calculated in real time by the virtual vehicle speed.

The virtual engine speed may be obtained from a value made by multiplying the virtual vehicle speed by the virtual gear ratio at the virtual current gear shift position. Alternatively, the virtual engine speed may be obtained from a value made by multiplying the drive system speed such as the motor speed by the virtual gear ratio at the virtual current gear shift position.

The virtual current gear shift position may be determined based on a gear shifting schedule map, preset in the controller, from the virtual vehicle speed and the accelerator pedal input value (APS value). When the virtual current gear shift position is determined as described above, the virtual engine speed may be calculated in real time by using the virtual vehicle speed or the motor speed and the virtual gear ratio corresponding to the gear shift position.

When the virtual current gear shift position is determined from the virtual vehicle speed and the accelerator pedal input value, the virtual engine speed may be calculated based on information about the determined virtual current gear shift position. In this case, the virtual sound may be generated in the vehicle based on information about the calculated virtual engine speed. As described above, the information about the gear shift position determined from the virtual vehicle speed and the accelerator pedal input value may be used, but instead of the gear shift position, a gear shift position, which is selected when the driver performs gear shifting manipulation by using a gear shifting manipulation device such as a shift lever, may be used to generate the virtual sound.

Figure 4:
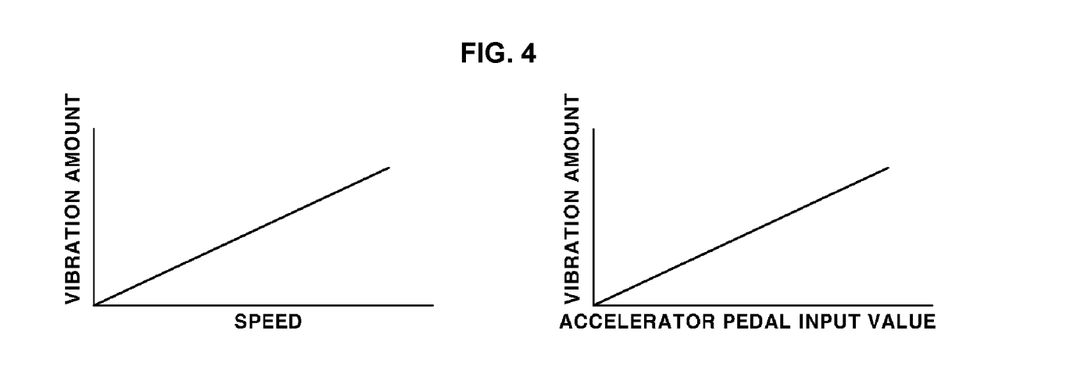
FIGS. 4 and 5 are views illustrating examples of controlling a virtual vibration and virtual sound in accordance with the embodiment of the present disclosure.
Figure 5:
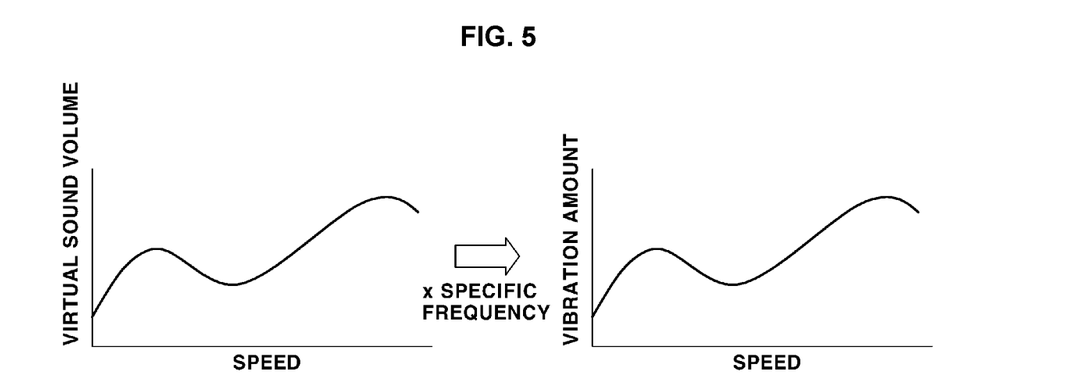

FIGS. 4 and 5 are views illustrating examples of controlling the virtual vibration and the virtual sound in accordance with the embodiment of the present disclosure, in which FIG. 4 illustrates a pattern of the virtual vibration while the vehicle travels at a constant speed, and FIG. 5 illustrates a virtual vibration pattern, determined based on the virtual sound, when the vehicle accelerates.

In the examples illustrated in FIGS. 4 and 5, the speed is the drive system speed and may be the motor speed, the driving wheel speed, the drive shaft speed, or the actual vehicle speed which is an actual variable in the electric vehicle. Alternatively, the speed may be the virtual engine speed or the virtual vehicle speed which is a virtual variable in the electric vehicle. Further, in FIG. 4, the speed and the accelerator pedal input value (APS value) may be substituted with the motor torque command.

In the present disclosure, the properties of the virtual effect may include a vibration amount and virtual sound volume determined based on the vehicle driving information (the actual variable or the virtual variable). In more detail, the properties of the virtual effect may include the vibration amount and the virtual sound volume in accordance with the accelerator pedal input value, the drive system speed, or the motor torque command which is the vehicle driving information.

In this case, the vibration amount may be substituted with an amplitude, and the properties of the virtual effect for generating the virtual vibration may include an amplitude, a frequency, and a frequency band of the vibration. In addition, the sound volume of the virtual sound means intensity of the sound, and the properties of the virtual effect for generating the virtual sound may include intensity, a time interval, and a frequency band or pitch of the virtual sound.

As illustrated in FIG. 4, the vibration amount may be determined as a value linearly proportional to the accelerator pedal input value and the drive system speed. That is, the vibration amount may have a larger value as the accelerator pedal input value and the drive system speed are increased. In addition, when the vibration amount is determined by using real-time actual variable information or the virtual variable information, the controller generates and outputs the virtual effect producing signal for generating the vibration corresponding to the determined vibration amount and controls the operation of the vibration actuator 100 based on the virtual effect producing signal.

As illustrated in FIG. 5, when the sound volume of the virtual sound is determined in accordance with the speed, the amount of virtual vibration may be determined, from the determined virtual sound volume, in the same pattern in accordance with the speed, such that the virtual vibration, which acts in conjunction with the virtual sound, may be generated.

Meanwhile, in the present disclosure, the controller may determine the properties of the virtual vibration from the properties of the virtual sound among the properties of the virtual effect and then generate the virtual effect producing signal in accordance with the determined properties of the virtual vibration. For example, as illustrated in FIG. 5, the sound volume of the virtual sound may be converted into the amount of virtual vibration.

Alternatively, when the virtual sound is outputted in the interior of the vehicle through the speaker 53, the sound in the interior of the vehicle may be sensed by the sensor, the sensed virtual sound signal may be processed and converted into the vibration signal by the controller, and the vibration actuator 100 may generate the virtual vibration by using the vibration signal as the virtual effect producing signal for generating the vibration.

In this case, the sensor may be a microphone (not illustrated) capable of inputting and sensing the sound signal. In addition, the process of generating the virtual vibration by the vibration actuator 100 by using the virtual vibration signal (virtual effect producing signal) generated by converting the sensed virtual sound signal may be performed in the same manner as the process of generating the virtual vibration by the vibration actuator 100 by using the virtual effect producing signal, as described above.

The method of generating the virtual sound and the virtual sound-based vibration has been described above. Hereinafter, a warning-signal-based vibration generating method capable of generating and generating vibration for warning of a dangerous situation will be described.

Figure 6:
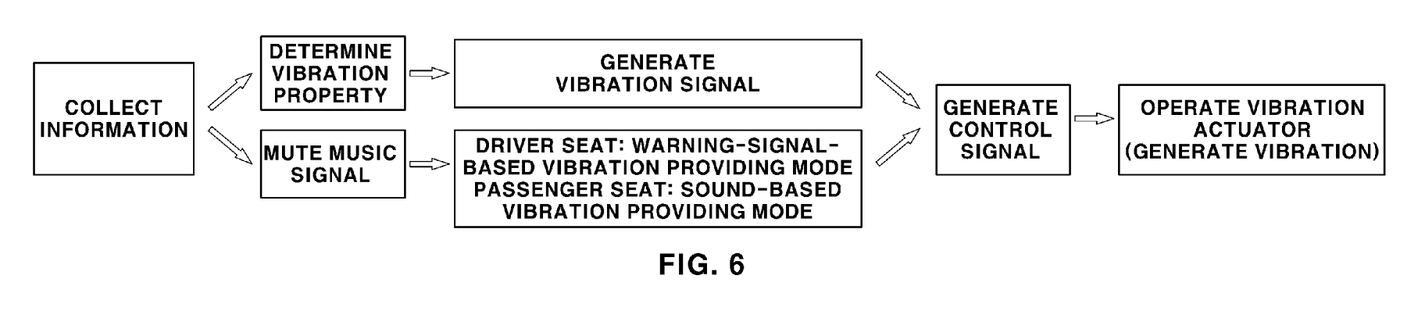
FIG. 6 is a view for explaining a vibration generating process according to the embodiment of the present disclosure.

FIG. 6 is a view for explaining a vibration generating process according to the embodiment of the present disclosure. As illustrated, when the controller (the first controller illustrated in FIG. 3) 20 of the vehicle collects information, that is, information for warning of a dangerous situation transmitted through the vehicle network from the detection element such as a sensor or another controller (e.g., the controller of the danger warning system), the controller 20 determines whether the current situation is a dangerous situation, in which a warning is required, based on the collected information.

When the controller determines, based on the collected information, that the current situation is the dangerous situation in which a warning is required, that is, when it is determined to warn of the dangerous situation, the controller determines the vibration property corresponding to the dangerous situation based on the collected information in accordance with the logic set in the controller, generates the warning signal in accordance with the determined vibration property, and generates and outputs the control signal for controlling the operation of the vibration actuator installed in the seat, based on the generated warning signal. In this case, the vibration properties may include a point in time at which the vibration is generated, vibration generation time, and a frequency and an amplitude (intensity) of the vibration, as described above.

In this case, the controller generates and outputs the control signal for generating the vibration having the above-mentioned properties based on the warning signal, thereby controlling the operation of the vibration actuator. In this case, the control signal serves to individually operate the plurality of vibration actuators and may be a signal for controlling an actuator driving current to be applied to each of the vibration actuators.

The control signal may be a control signal for allowing the respective vibration actuators or the groups of the vibration actuators to generate vibrations which are different in at least one of the vibration properties. Alternatively, in the state in which the plurality of vibration patterns having different vibration properties is set and configured in advance, the control signal may be a control signal for allowing the respective vibration actuators or the groups of the vibration actuators to generate vibrations having different vibration patterns.

Accordingly, the vibration actuators in the seat operate based on the control signal outputted by the controller and generate the vibration, which is designated in accordance with the dangerous situation, and as a result, the driver or the passenger seated in the seat may feel the vibration generated in accordance with the dangerous situation. According to the present disclosure, a warning-signal-based vibration, which is generated based on the warning signal, may be implemented and provided.

In the embodiment of the present disclosure, the vibration property may be determined as a value preset in accordance with the dangerous situation determined by the detection element such as the sensor or the dangerous situation transmitted from another controller (e.g., the controller of the danger warning system). Further, in the embodiment of the present disclosure, a vibration frequency, among the vibration properties for warning of the dangerous situation, may be set within a range of 65 Hz to 80 Hz.

Seat vibration modes during vehicle driving include a torsional mode, a vertical bending mode, a lateral bending mode, and the like, and the seat vibration modes include a cushion frame mode, a back frame mode, and the like which are distinguished in respect to sections of the seat. Because the vibration frequency in the seat vibration mode exists within a range of 15 Hz to 60 Hz, a value of an appropriate vibration frequency of the warning signal may be 65 Hz to 80 Hz in order to avoid resonance with the human body's natural frequency (chest: 60 Hz or less, knee: 2 Hz to 20 Hz).

In a case in which the virtual sound is being outputted or music is being played through the speakers in the vehicle, the controller may control the acoustic device so that a sound channel at least corresponding to the driver seat is muted for a predetermined delay time. At the same time, the controller may stop the generation of the virtual vibration by the vibration actuator seated in the driver seat for the predetermined delay time. Further, after the mute state is made and the generation of the virtual vibration is stopped for the delay time, the controller generates the vibration for warning of the dangerous situation by operating the vibration actuator in the driver seat in a warning-signal-based vibration generating mode.

In this case, the delay time is a predetermined time to temporarily stop the speaker output and the operation of the vibration actuator when the warning-signal-based vibration generating mode is initiated or stopped, and the delay time is used as a delay time when switching between the warning-signal-based vibration generating mode and other modes. For example, the delay time may be applied to switch between a virtual sound-based vibration generating mode in which the virtual sound is outputted and simultaneously the virtual vibration is generated and the warning-signal-based vibration generating mode in which the vibration for warning of the dangerous situation is generated.

The user (driver) may adjust and change the delay time to a desired value through an acoustic device setting menu in an interface unit (that may be the 'interface unit' having reference numeral 11 in FIG. 3). In addition to the delay time, the driver may adjust and change, to desired values or patterns, the vibration properties for the various dangerous situations of the danger warning system, for example, a frequency, an amplitude (intensity), or a pattern of the vibration.

In the embodiment of the present disclosure, the warning-signal-based vibration generating mode may be performed only for the driver seat when the dangerous situation is detected as described above. In this case, the vibration actuator installed in the driver seat operates based on the warning signal and the control signal generated from the warning signal, thereby generating the vibration for warning of the dangerous situation. In addition, during the warningsignal-based vibration generating mode, the operation of the vibration actuator in the remaining seats, for example, the passenger seat, except for the driver seat may be controlled in the virtual sound-based vibration generating mode.

Figure 7:
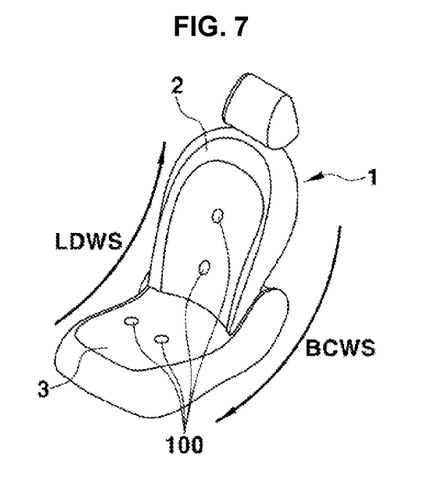
FIG. 7 is a view for explaining an example of a vibration generating method according to the embodiment of the present disclosure.

FIG. 7 is a view for explaining an example of the vibration generating method according to the embodiment of the present disclosure. In the example illustrated in FIG. 7, a total of four vibration actuators are installed in the seat, and one vibration actuator is installed and disposed on each of the left and right sides of the seat cushion. In addition, one vibration actuator is installed and disposed on each of the upper and lower sides of the seatback. Of course, the numbers and the installation positions of the vibration actuators installed in the seat as illustrated in FIG. 7 are exemplary and may be changed.

FIG. 7 illustrates an example in which the vibration warning is performed when the lane departure warning system (LDWS) and the blind-spot collision warning system (BCWS) are operated as a danger warning system. As illustrated, the point in time at which each of the vibration actuators operates (the point in time at which the vibration is generated) may vary depending on the dangerous situation. In this case, all the vibration actuators may be operated one by one or several at a time and may be sequentially operated in a predetermined order.

In the vehicle equipped with the plurality of danger warning systems, the order of operation of the vibration actuator for detecting a dangerous situation may be set differently for each of the danger warning systems. That is, the vibration actuators are sequentially operated, but the order of operation is set differently for each of the danger warning systems. In this case, the portions of the seat, where the vibration is generated, may be sequentially changed, such that directionality of vibration generation may be provided in the seat. In addition, among the plurality of vibration actuators, only the designated vibration actuator may be selectively operated.

As illustrated in FIG. 7, the lane departure warning system may operate the actuators in the order of the vibration actuator on the right or left side of the seat cushion→the vibration actuator on the lower side of the seatback→the vibration actuator on the upper side of the seatback. That is, the lane departure warning system provides the directionality of vibration generation as if the vibrating portion is moved from the front side to the rear side in the seat.

In this case, in a case in which the vehicle may depart from the right lane, the lane departure warning system may first operate the vibration actuator on the right side of the seat cushion (the right side based on the driver seated in the seat). In a case in which the vehicle may depart from the left lane, the lane departure warning system may first operate the vibration actuator on the left side of the seat cushion. As described above, the lane departure warning system may selectively operate one of the right and left vibration actuators in accordance with a lane departure direction. In this case, the driver may easily recognize, from the seat vibration, the lane departure direction as dangerous situation information.

Since the direction of vibration generation may vary depending on the order of operations of the vibration actuators, the driver may recognize the dangerous situation of the corresponding danger warning system which is distinguished from the dangerous situations of the other danger warning systems. That is, the blind-spot collision warning system may sequentially operate the vibration actuators in the order of the vibration actuator on the upper side of the seatback→the vibration actuator on the lower side of the seatback→the vibration actuator on the right or left side of the seat cushion, unlike the lane departure warning system. That is, the blind-spot collision warning system provides the directionality of vibration generation as if the vibrating portion is moved from the rear side to the front side in the seat.

In this case, in a case in which the vehicle may collide with an obstacle on the right side thereof, the blind-spot collision warning system may last operate the vibration actuator on the right side of the seat cushion. In a case in which the vehicle may collide with an obstacle on the left side thereof, the blind-spot collision warning system may last operate the vibration actuator on the left side of the seat cushion. As described above, the blind-spot collision warning system may selectively operate one of the right and left vibration actuators in accordance with a direction in which the obstacle is positioned. In this case, the driver may easily recognize, from the seat vibration, a vehicle collision direction as dangerous situation information.

Although not illustrated in the drawings, the vibration actuators may also be installed on left and right portions of the seatback based on the driver seated in the seat, and the controller may identify an obstacle or vehicle which is at the risk of colliding with the vehicle, a direction in which a pedestrian is positioned, or the lane departure direction, and then operate the vibration actuator positioned in the corresponding direction among the left and right vibration actuators in the seatback.

When the lane departure warning system warns of the dangerous situation, vibration intensity of the vibration actuator positioned on the foremost side in the seat, that is, vibration intensity (amplitude) of the right vibration actuator or the left vibration actuator, which is coincident with the lane departure direction among the vibration actuators in the seat cushion may be highest. In this case, the lane departure warning system may allow the driver to more assuredly feel as if the vibration is moved from the front side to the rear side in the seat.

When the blind-spot collision warning system warns of the dangerous situation, vibration intensity of the vibration actuator positioned behind the seat, that is, vibration intensity of the vibration actuators on the upper and lower sides of the seatback may be set to be higher than that of the vibration actuator in the seat cushion. In this case, the blind-spot collision warning system may allow the driver to more assuredly feel as if the vibration is moved from the rear side to the front side in the seat.

For example, when the lane departure warning system warns of the dangerous situation, the vibration intensity of the vibration actuator on the right or left side of the seat cushion may be set to, as the highest and largest intensity, 60 dB which is vibration sensitivity that the human body feels most sensitively. On the contrary, when the blind-spot collision warning system warns of the dangerous situation, vibration intensity of the vibration actuators on the upper and lower sides of the seatback may be set to 60 dB, which is higher than vibration intensity of the vibration actuator in the seat cushion.

When the driver state warning system determines that the driver is drowsy, the controller may set all the vibration actuators, installed in the seat, to generate large vibrations.

Although the embodiments of the present disclosure have been described in detail hereinabove, the right scope of the present disclosure is not limited thereto, and many variations and modifications made by those skilled in the art using the basic concept of the present disclosure, which is defined in the following claims, will also belong to the right scope of the present disclosure.

What is claimed is:

1. A vibration generating method for a vehicle, the vibration generating method comprising the steps of:
   collecting, by a controller, information for warning of a dangerous situation of the vehicle and determining whether to warn of the dangerous situation, based on the collected information;
   determining, by the controller, a vibration property in accordance with the dangerous situation based on the collected information;
   generating, by the controller, a warning signal corresponding to the dangerous situation based on the determined vibration property;
   generating and outputting, by the controller, a control signal for generating vibration having the vibration property based on the generated warning signal; and
   operating a vibration actuator installed in a seat, based on the outputted control signal and generating the vibration, representing the dangerous situation, through the seat;
   wherein the vibration actuator comprises a plurality of vibration actuators installed in a seatback and a seat cushion of the seat;
   wherein the controller determines the vibration property for each of the plurality of vibration actuators;
   wherein the determined vibration property allows one or more of the vibration actuators in the seatback and one or more of the vibration actuators in the seat cushion to be alternatively operated such that sequential vibrations having directionality are generated in the seat when it is determined to warn of the dangerous situation,
   wherein the vehicle includes a plurality of danger warning systems,
   wherein each danger warning system of the plurality of danger warning systems is configured to warn of one or more dangerous situations that occur in the vehicle, and
   wherein the order of operation of the vibration actuators is set differently for each danger warning system.

2. The vibration generating method of claim 1, wherein the controller collects, as the information for warning of the dangerous situation, information representing the dangerous situation detected by a danger warning system of the plurality of danger warning systems, , and the step of determining the vibration property determines the vibration property corresponding to the dangerous situation detected by the danger warning system.

3. The vibration generating method of claim 2, wherein the vibration property comprises a point in time at which the vibration is generated, a vibration generation time, and a frequency and an intensity of the vibration which are preset for the vibration actuator in accordance with the dangerous situation.

4. The vibration generating method of claim 3, wherein the vibration property comprises the point in time at which the vibration is generated, the vibration generation time, and the frequency and the intensity of the vibration which are preset for each of the vibration actuators in accordance with the dangerous situation.

5. The vibration generating method of claim 4, wherein the danger warning system of the vehicle comprises at least one of a lane departure warning system configured to detect and warn of the dangerous situation in which the vehicle departs from a lane or a blind-spot collision warning system configured to detect and warn of the dangerous situation in which the vehicle collides with an obstacle positioned behind or beside the vehicle.

6. The vibration generating method of claim 5, wherein the plurality of vibration actuators comprises vibration actuators disposed on left and right sides of the seatback or the seat cushion, the controller determines the vibration property for each of the vibration actuators, and the vibration properties allow one vibration actuator, selected from the left and right vibration actuator, to operate based on a lane departure direction or a direction in which the obstacle is positioned.

7. The vibration generating method of claim 5, wherein the vibration property allows one or more of the vibration actuators installed in the seat cushion, one or more of the vibration actuators installed on a lower side of the seatback, and one or more of the vibration actuators installed on an upper side of the seatback to be sequentially operated such that the sequential vibrations having directionality are generated in the seat, when it is determined to warn of the dangerous lane departure situation detected by the lane departure warning system.

8. The vibration generating method of claim 5,
   wherein the vibration property allows the vibration actuator installed on an upper side of the seatback, the vibration actuator installed on a lower side of the seatback, and the vibration actuator installed in the seat cushion to be sequentially operated such that sequential vibrations having directionality are generated in the seat, when it is determined to warn of the dangerous collision situation detected by the blind-spot collision warning system.

9. The vibration generating method of claim 4, wherein the danger warning system of the vehicle comprises one or more of a forward collision warning system configured to detect and warn of the dangerous situation in which the vehicle collides with an obstacle in front of the vehicle, a pedestrian detection warning system configured to detect and warn of approach of a pedestrian, or a driver state warning system configured to detect and warn of a driver state.

10. The vibration generating method of claim 9, wherein the plurality of vibration actuators comprises vibration actuators disposed on left and right sides of the seatback or the seat cushion, the controller determines the vibration property for each of the vibration actuators, and the vibration properties allow one vibration actuator, selected from the left and right vibration actuators, to operate based on a direction in which the pedestrian is positioned, when it is determined to warn of the approach of the pedestrian detected by the pedestrian detection warning system.

11. The vibration generating method of claim 1, further comprising steps of:
   collecting, by the controller, vehicle driving information for generating a virtual effect while the vehicle travels;
   determining, by the controller, a property of the virtual effect based on the collected vehicle driving information;
   generating, by the controller, a virtual effect producing signal for producing the virtual effect having the determined property;
   generating and outputting, by the controller, a control signal for generating a virtual vibration representing the property of the virtual effect based on the generated virtual effect producing signal; and operating the vibration actuator, installed in the seat, based on the control signal for generating the virtual vibration and generating the virtual vibration through the seat.

12. The vibration generating method of claim 11, further comprising a step of operating, by the controller, an acoustic device of the vehicle based on the generated virtual effect producing signal for generating the virtual sound representing the property of the virtual effect and generating the virtual sound in the vehicle.

13. The vibration generating method of claim 12, wherein the controller selectively performs one of a warning-signal-based vibration generating mode in which the respective steps are performed to provide the vibration representing the dangerous situation and a sound-based vibration generating mode in which the steps are performed to provide the virtual vibration together with the step of generating the virtual sound, and the controller stops the sound output and the vibration generation for a predetermined delay time when switching between the two modes.

14. The vibration generating method of claim 13, wherein when the controller determines that there is the necessity to warn of the dangerous situation, the controller switches from the sound-based vibration generating mode to the warning-signal-based vibration generating mode to operate the vibration actuator installed in the driver seat in the warning-signal-based vibration generating mode.

* * * * *